June 9, 1925. 1,541,735
J. E. OBERG
LOCKING DEVICE
Filed March 7, 1924
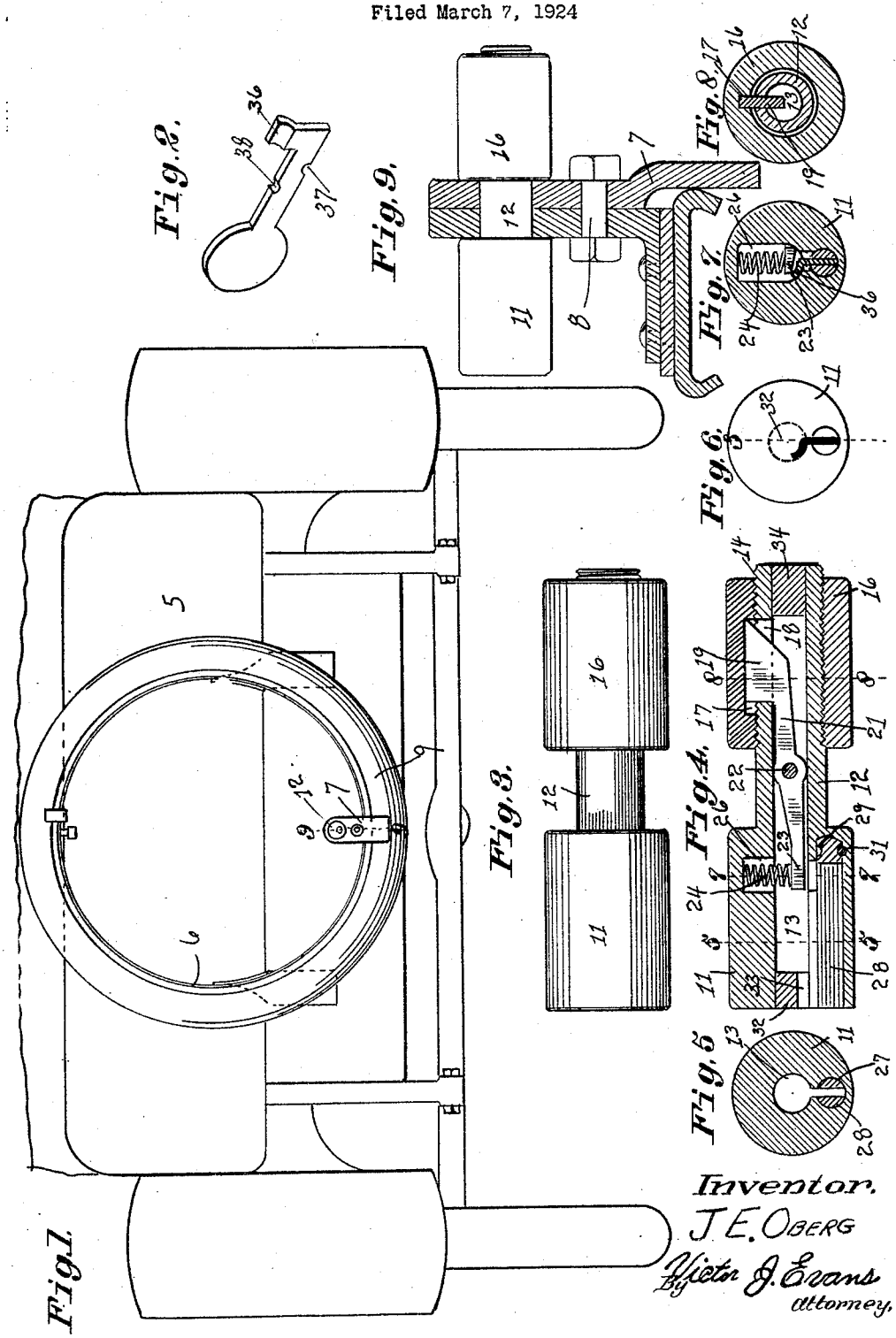
Inventor.
J. E. Oberg
By Victor J. Evans
Attorney.

Patented June 9, 1925.

1,541,735

UNITED STATES PATENT OFFICE.

JOHN E. OBERG, OF TAFT, CALIFORNIA.

LOCKING DEVICE.

Application filed March 7, 1924. Serial No. 697,581.

*To all whom it may concern:*

Be it known that I, JOHN E. OBERG, a citizen of the United States, residing at Taft, in the county of Kern and State of California, have invented new and useful Improvements in Locking Devices, of which the following is a specification.

This invention relates to improvements in locking devices and has particular reference to a lock for securing spare tires to the rack of an automobile.

The principal object of this invention is to produce a simply constructed lock of the character described which cannot be easily opened.

A further object is to produce a device of this character which is simple in construction, economical to manufacture, one which cannot be easily disarranged and a lock which is highly serviceable in use.

A still further object is to produce a lock which is of such a construction that the same may be hardened thereby eliminating the possibility of sawing.

Other objects and advantages will be apparent during the course of the following description.

In the accompanying drawings forming a part of this specification, and in which like numerals are employed to designate like parts throughout the same, Figure 1 is a rear elevation of an automobile showing a tire rack having my lock positioned thereon, Figure 2 is a perspective view of the key employed in my lock, Figure 3 is a side elevation of my complete lock, Figure 4 is a longitudinal cross-section of my lock, Figure 5 is a cross-section taken on the line 5—5 of Figure 4, Figure 6 is an end elevation, Figure 7 is a cross-section taken on the line 7—7 of Figure 4, Figure 8 is a cross-section taken on the line 8—8 of Figure 4, and Figure 9 is a cross-section taken on the line 9—9 of Figure 1.

At the present time many forms of locks are employed for securing a spare tire and rim upon the tire rack. It has been found possible for persons acting unlawfully to appropriate the tire so placed by sawing the lock and cutting the chain or other retaining device. I have therefore sought to provide a lock which is simple in construction and one which cannot be easily tampered with.

In the accompanying drawings wherein for the purpose of illustration is shown a preferred embodiment of my invention, the numeral 5 designates an automobile as a whole having the customary tire bracket 6 secured thereto. This tire bracket has a lock 7 pivoted upon a retaining bolt 8, which lock 7 serves to retain the tire 9 upon the bracket. Thus far the description refers to the ordinary tire holding means.

By referring to Figure 3 it will be noted that at 11 I have provided a head with which is formed an integral extension 12. This head and extension are bored as shown at 13, the purpose of which will be later seen.

The extension 12 is screw threaded as shown at 14, so as to receive a retainer 16, which retainer has a circular cross-section corresponding in cross-section to the head 11. A slot 17 is formed in the retainer 16, which slot extends to a slot 18 formed in the extension 12 and communicating with the bore 13. The purpose of this slot is to permit the end 19 of a pivoted locking dog 21 to extend therethrough so as to enter the slot 17.

This dog 21 is pivoted at 22 within the bore 13 and has its opposite end 23, contacted by the spring 24, the oposite end of which spring is retained in a recess 26 formed in the head 11. This head is also provided with an auxiliary bore 27 within which is positioned a rotatable key guide 28, which key guide is provided with an annular groove 29 adapted to guide a pin 31 carried in the head, thereby preventing withdrawal of the guide to permit rotation thereof.

A plug 32 recessed as shown at 33 serves to close one end of the bore 13, while a plug 34 serves to close the opposite end of the bore 13.

The key is provided with notches as shown at 37 and 38, which notches are adapted to clear pins mounted within the device. The result of this construction being that by rearranging the pins and the notches it is possible to perfect different key combinations.

The manner of operating my device is as follows:—

The key is inserted in the guide 28 until the end 36 is at a point adjacent the end 23 of the dog 21. By now turning the key the dog will be pivoted so as to withdraw the end 19 from the slot 17, thus releasing the retainer 16. This retainer can then be rotated upon its thread 14 until actually removed from the extension 12. The reverse operation results in the locking of the device and as soon as the key is removed, the dog will enter the slot 17 when the slot is brought into alignment therewith. The device is employed for the purpose of preventing rotation of the tire locking member 7, so that the same cannot be rotated upon its bolt 8.

It is to be understood that the form of my invention, herewith shown and described is to be taken as a preferred example of the same and that various changes in the shape, size and arrangement of parts may be resorted to without departing from the spirit of the invention, or the scope of the subjoined claim.

Having thus described my invention, I claim:—

In a device of the character described, a head, an extension formed integral therewith, a central bore extending through said head and said extension, said extension having a slot formed therein and communicating with said bore, a dog pivotally mounted in said bore, said dog having an enlarged end extending through said slot, the opposite end of said dog having a spring in contact therewith so as to force said enlarged end through said slot, a retainer adapted to threadedly engage said extension, said retainer having a slot formed therein and adapted to be engaged by the head of said dog, a rotatable key guide positioned in said head, and a key adapted to be inserted in said guide so as to pass beneath said dog for the purpose of counter-acting the action of said spring when the head of said dog is to be withdrawn from the slot in said retainer.

In testimony whereof I affix my signature.

JOHN E. OBERG.